(12) United States Patent
Seidl et al.

(10) Patent No.: US 6,751,709 B2
(45) Date of Patent: Jun. 15, 2004

(54) METHOD AND APPARATUS FOR PREFETCHING OBJECTS INTO AN OBJECT CACHE

(75) Inventors: Matthew L. Seidl, Longmont, CO (US); Gregory M. Wright, Mountain View, CA (US); Mario I. Wolczko, San Carlos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 178 days.

(21) Appl. No.: 10/146,268

(22) Filed: May 15, 2002

(65) Prior Publication Data

US 2003/0217231 A1 Nov. 20, 2003

(51) Int. Cl.[7] .............................................. G06F 12/00
(52) U.S. Cl. ....................................... 711/137; 712/207
(58) Field of Search ................................. 711/137, 118; 712/205–207; 707/10

(56) References Cited

U.S. PATENT DOCUMENTS

| | | | | |
|---|---|---|---|---|
| 5,537,573 A | * | 7/1996 | Ware et al. ................. 711/137 |
| 5,623,608 A | * | 4/1997 | Ng ............................ 711/137 |
| 6,085,193 A | * | 7/2000 | Malkin et al. ................ 707/10 |
| 6,442,651 B2 | * | 8/2002 | Crow et al. ................. 711/118 |
| 6,484,239 B1 | * | 11/2002 | Hill et al. .................... 711/137 |
| 6,598,048 B2 | * | 7/2003 | Carneal et al. ............... 707/10 |

* cited by examiner

*Primary Examiner*—Nasser Moazzami
(74) *Attorney, Agent, or Firm*—Park Vaughan & Fleming LLP

(57) ABSTRACT

One embodiment of the present invention provides a system that uses references within a first object to prefetch a second object into a cache memory. During operation, the system receives a first cache line containing at least a portion of the first object. Next, the system locates a reference to the second object within the first cache line, and uses the reference to perform a prefetching operation for the second object. In a variation on this embodiment, while performing the prefetching operation for the second object, the system examines the cache memory to determine if the second object is already present within the cache memory. If not, the system performs the prefetching operation for the second object.

32 Claims, 3 Drawing Sheets

METHOD AND APPARATUS FOR PREFETCHING OBJECTS INTO AN OBJECT CACHE

RELATED APPLICATION

The subject matter of this application is related to the subject matter in a co-pending non-provisional application by the same inventors as the instant application entitled, "Object Addressed Memory Hierarchy" having serial number TO BE ASSIGNED, and filing date Feb. 7, 2002 (Attorney Docket No. 116159.072001).

BACKGROUND

1. Field of the Invention

The present invention relates to the design of memory hierarchies within computer systems. More specifically, the present invention relates to a method and an apparatus for using references within an object to prefetch other objects into an object cache.

2. Related Art

As the gap between memory speed and processor speed grows ever larger, programs that access data structures that are too large to fit into cache memory incur progressively larger performance penalties. To alleviate this problem, some computer systems employ a hardware prefetcher that looks for patterns of memory accesses. When such a pattern is discovered, the prefetcher prefetches ahead of the program to ensure that the needed data will be present in cache.

Prefetchers work relatively well for programs with regular memory access patterns, such as scientific applications that manipulate large arrays of data. However, they work poorly for object-oriented or pointer-based applications, such as programs written in the JAVA programming language. In pointer-based applications, the next data element to be retrieved by the application is not located at a regular offset from the current data element, because a pointer can generally refer to an arbitrary location in memory.

Moreover, because pointers cannot presently be identified within cache lines, existing prefetching systems must rely on heuristics to guess which words in a cache line contain pointers that are worth prefetching.

Furthermore, even when such a pointer can be identified, the pointer is in the form of virtual addresses, which must first be translated into a physical address before a prefetching operation can take place. This translation process takes additional time.

What is needed is a method and an apparatus for prefetching cache lines for object-oriented and/or pointer-based applications that overcomes the above-described problems.

SUMMARY

One embodiment of the present invention provides a system that uses references within a first object to prefetch a second object into a cache memory. During operation, the system receives a first cache line containing at least a portion of the first object. Next, the system locates a reference to the second object within the first cache line, and uses the reference to perform a prefetching operation for the second object.

In a variation on this embodiment, while performing the prefetching operation for the second object, the system examines the cache memory to determine if the second object is already present within the cache memory. If not, the system performs the prefetching operation for the second object.

In a variation on this embodiment, locating the reference to the second object involves examining type information associated with data items in the first cache line to determine whether the data items contain references.

In a variation on this embodiment, locating the reference to the second object involves using the offsets of data items within the first object to determine whether the data items contain references.

In a variation on this embodiment, locating the reference to the second object involves locating a class pointer within the first object that points to a class object associated with the first object.

In a variation on this embodiment, performing the prefetching operation for the second object involves prefetching a second cache line containing at least a portion of the second object.

In a variation on this embodiment, performing the prefetching operation for the second object involves prefetching an object table entry for the second object. This object table entry maps an object ID to an address where the second object is located.

In a variation on this embodiment, if the first cache line contains only a portion of the first object, the system prefetches another portion of the first object. Note that this may involve prefetching a header for the first object.

In a variation on this embodiment, the first object and the second object are defined within an object-oriented programming system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Computer System

Figure 1:
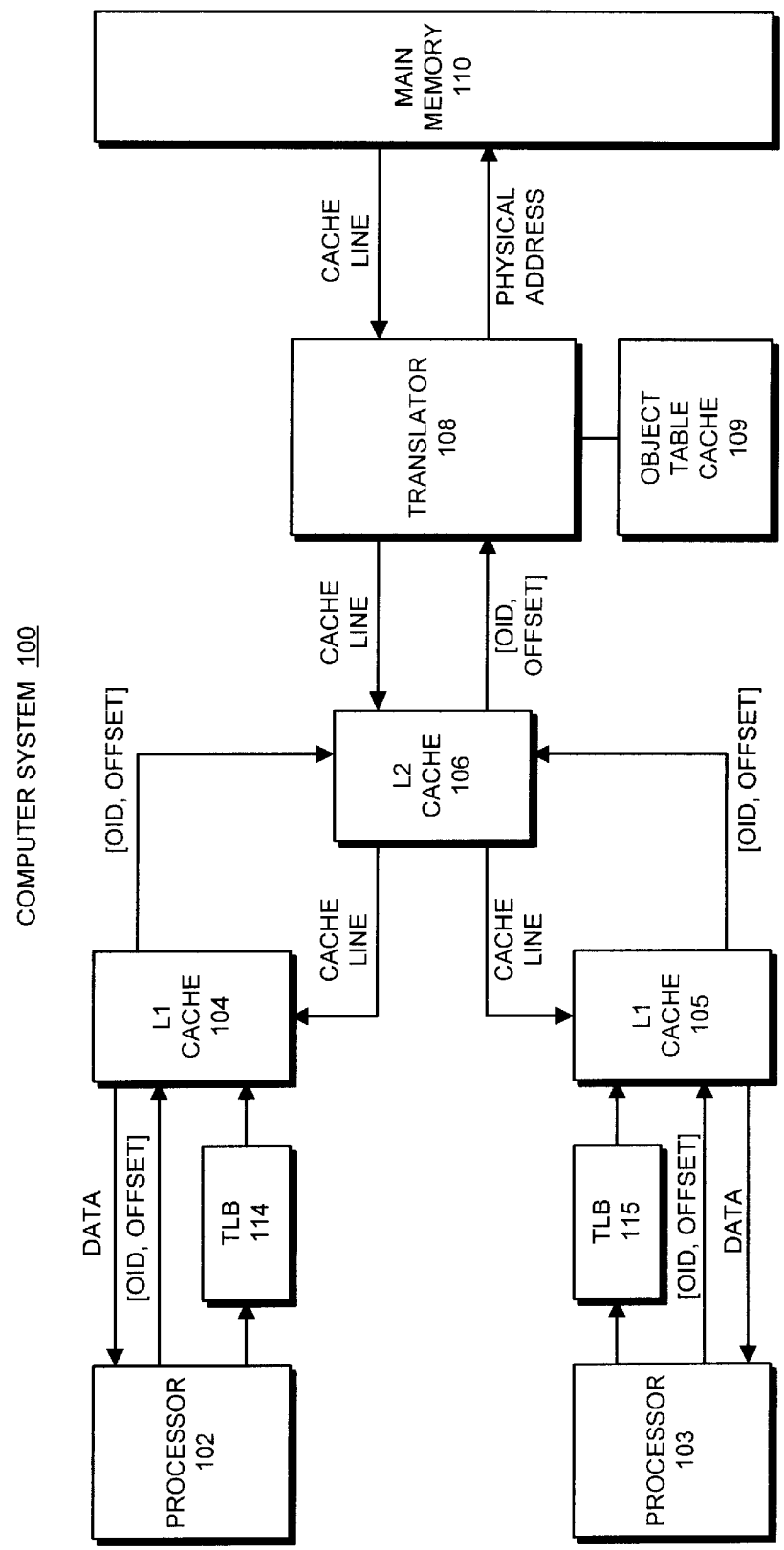
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance.

As is illustrated in FIG. 1, computer system 100 includes processors 102 and 103. Processors 102 and 103 access code and data from L1 caches 104 and 105, respectively. Note that L1 caches 104 and 105 can include unified instruction/data caches, or alternatively, separate instruction caches and data caches.

Processors 102 and 103 are associated with translation lookaside buffers (TLBs) 114 and 115, which facilitate translating virtual addresses into physical addresses for non-object references.

L1 cache 104 and L1 cache 105 make use of an extended address encoding procedure that enables L1 cache 104 to function as both a conventional cache and an object cache. For example, during a conventional load operation, a virtual address is sent from processor 102 to TLB 114. TLB 114 translates the virtual address into a physical address, which is subsequently used by L1 cache 104.

In contrast, during a load operation involving a portion of an object, processor 102 obtains the corresponding object ID (OID) and offset and combines them to create an object address. This object address is embedded into an unused portion of the physical address space to produce an encoded address. Note that the higher order bits of this encoded address are different than the higher order bits of any physical address. This allows the system to distinguish an encoded address from a physical address. When the encoded address is subsequently sent from processor 102 to L1 cache 104, the encoded address bypasses TLB 114 and directly enters L1 cache 104. Note that only minor modifications are required to conventional cache designs in order to provide object caching using the above-described technique.

In order to request a non-object data item, such as a value from a normal virtual address, processor 102 generates a virtual address that is sent to TLB 114. TLB 114 translates this virtual address into a physical address, which is sent to L1 cache 104.

Note that after an object address is translated into an encoded address L1 cache 104, L1 cache 105 and L2 cache 106 can treat the encoded address in the same manner as a normal physical address.

If a given data item (or instruction) is not located within L1 cache 104 or L1 cache 105, it is retrieved from L2 cache 106. If it is not located within L2 cache 106, it is pulled into L2 cache 106 from main memory 110.

Unlike in a conventional memory hierarchy, a translator 108 is interposed between L2 cache 106 and main memory 110. Translator 108 converts an object address, comprising an object ID and an offset, into a corresponding physical address, which is sent to main memory 110.

If an object is not present within L2 cache 106, the encoded address is forwarded to translator 108. Translator 108 uses an object table to translate the encoded address into a corresponding physical address. Each object table entry associates a given object ID with a corresponding physical address in main memory where the object resides. Note that this object table, which contains translations for all objects, can be located in main memory 110.

When a cache miss for an object occurs in L2 cache 106, translator 108 intercepts the encoded address and extracts the object ID. Translator 108 uses the object ID to search the object table for a corresponding physical address. Once the physical address is found, translator converts the load request for the object into a load request for a physical address in main memory 110.

The system uses the physical address and the offset to locate a specific cache line (or cache lines) in main memory 110. Prefetching circuitry within translator 108 directs the normal load hardware to issue a load instruction to main memory 110. This fetching circuitry subsequently receives the cache line corresponding to the physical address. The fetching circuitry then forwards the cache line to L2 cache 106.

Object cache lines differ from conventional physical cache lines because object cache lines can start on arbitrary word boundaries, whereas physical cache lines are delineated by larger power-of-two address boundaries. Hence, physical cache lines and object cache lines may not always align. For example, a physical cache line with a length of 64 bytes always starts at a physical address that is a multiple of 64. Objects, however, may start on any physical address which is a multiple of four. Thus, a 64-byte object cache line starting at address 44 includes addresses (44 . . . 107). This overlaps with physical cache lines (0 . . . 63) and (64 . . . 127). In this case, the object is split across two physical cache lines. Hence, two load operations may be required to retrieve the entire object cache line. Once both physical cache lines have been retrieved, the portions of the cache lines containing the object cache line, (44 . . . 63) and (64 . . . 107), are concatenated together to form the object cache line (44 . . . 107). Other portions of the physical cache lines are discarded.

In the event of an eviction from L2 cache 106, translator 108 converts the encoded address containing the object ID and the offset into a physical address. The fetching circuitry subsequently uses the physical address to generate a store operation to store the evicted cache line in main memory 110.

Note that if computer system 100 supports in-cache creation of objects, translator 108 allocates space for an object in physical memory the first time a part of the object is evicted from L2 cache 106. In-cache creation of objects provides significant advantages because short-lived objects only exist in cache memory. Hence, space for short-lived objects never has to be allocated in main memory 110.

For performance reasons the fetching circuitry within translator 108 makes use of an object table cache 109, which stores object table entries that are likely to be used to perform translations. Note that object table cache 109 operates similarly to a TLB, except that instead of storing commonly used virtual-to-physical address translations, object table cache 109 stores commonly used object ID-to-physical address translations. Note that during the prefetching process described below, the system can retrieve an object table entry into object table cache 109 instead of pulling an entire cache line for the object into L2 cache 106.

Note that processors 102 and 103 are configured to handle the extended address encoding procedure described above. In one embodiment of the present invention, a platform-independent virtual machine, such as a JAVA VIRTUAL MACHINE, is modified to generate requests for portions of an object using an object ID and an offset. Moreover, in one embodiment of the present invention, processors 102 and 103 are configured to execute special instructions for performing load and store operations involving an object ID and an offset—in addition to normal load and store instructions that use virtual addresses.

Although the present invention is described with reference to a computer system 100 with two cache levels, the present invention can generally be used with any single-level or multi-level caching structure. Furthermore, although computer system 100 includes two processors, the present invention can generally be used with any number of processors.

Prefetching Objects

Figure 2:
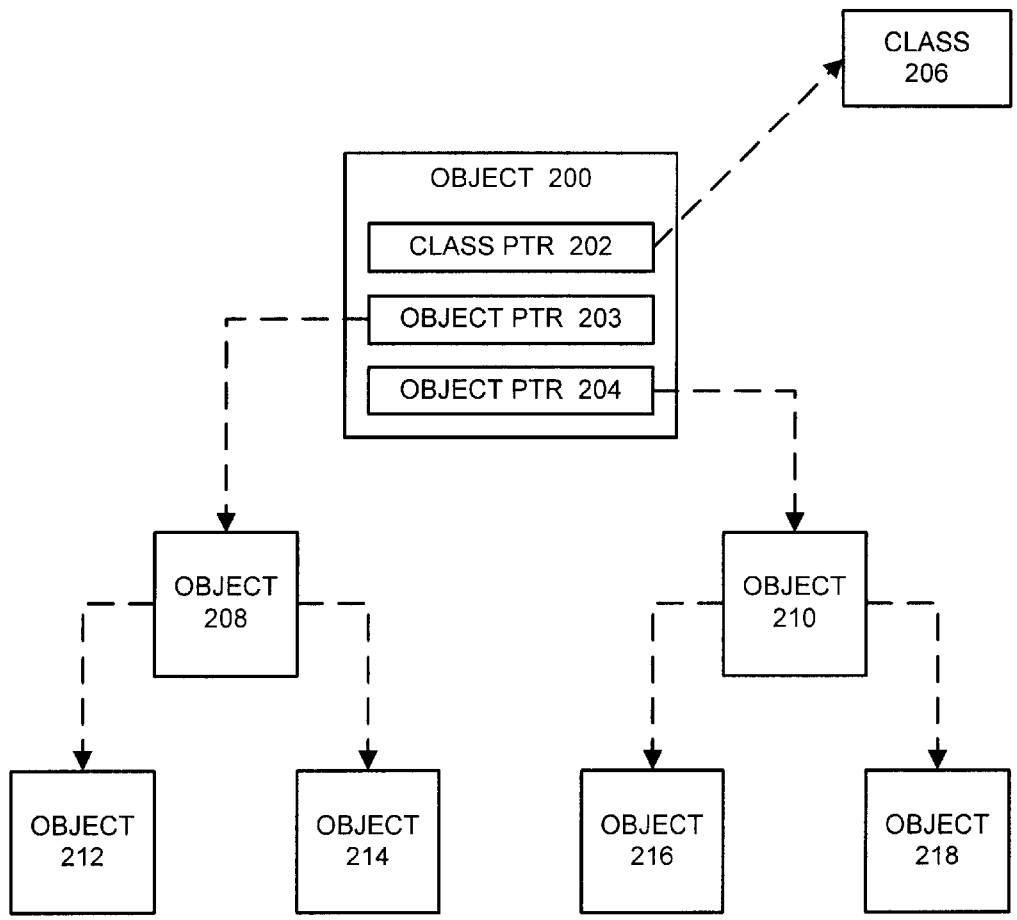
FIG. 2 illustrates a collection of objects in accordance with an embodiment of the present invention.

FIG. 2 illustrates a collection of interlinked objects in accordance with an embodiment of the present invention. As is illustrated in FIG. 2, an object 200 contains a number of pointers, including a class pointer 202 and a number of object pointers 203 and 204. Class pointer 202 points to a class object 206 associated with object 200, whereas object pointers 203 and 204 point to other objects, namely object 208 and object 210, respectively. Object 208 itself includes pointers to objects 212 and 214. Similarly, object 210 includes pointers to objects 216 and 218. Furthermore, objects 212, 214, 216 and 218 may themselves point to other objects, which are not illustrated in FIG. 2.

When object 200 is fetched for the first time, it is likely that class object 206 will eventually be required, so it is advantageous to prefetch class object 206. It is also somewhat likely that objects 208 and object 210 will eventually be required, so it may be advantageous to prefetch objects 208 and 210. It may even be advantageous to prefetch objects 212, 214, 216 and 218 in case they are referenced in the future.

Details of this prefetching process are described in more detail below with reference to FIG. 3.

Prefetching Process

Figure 3:
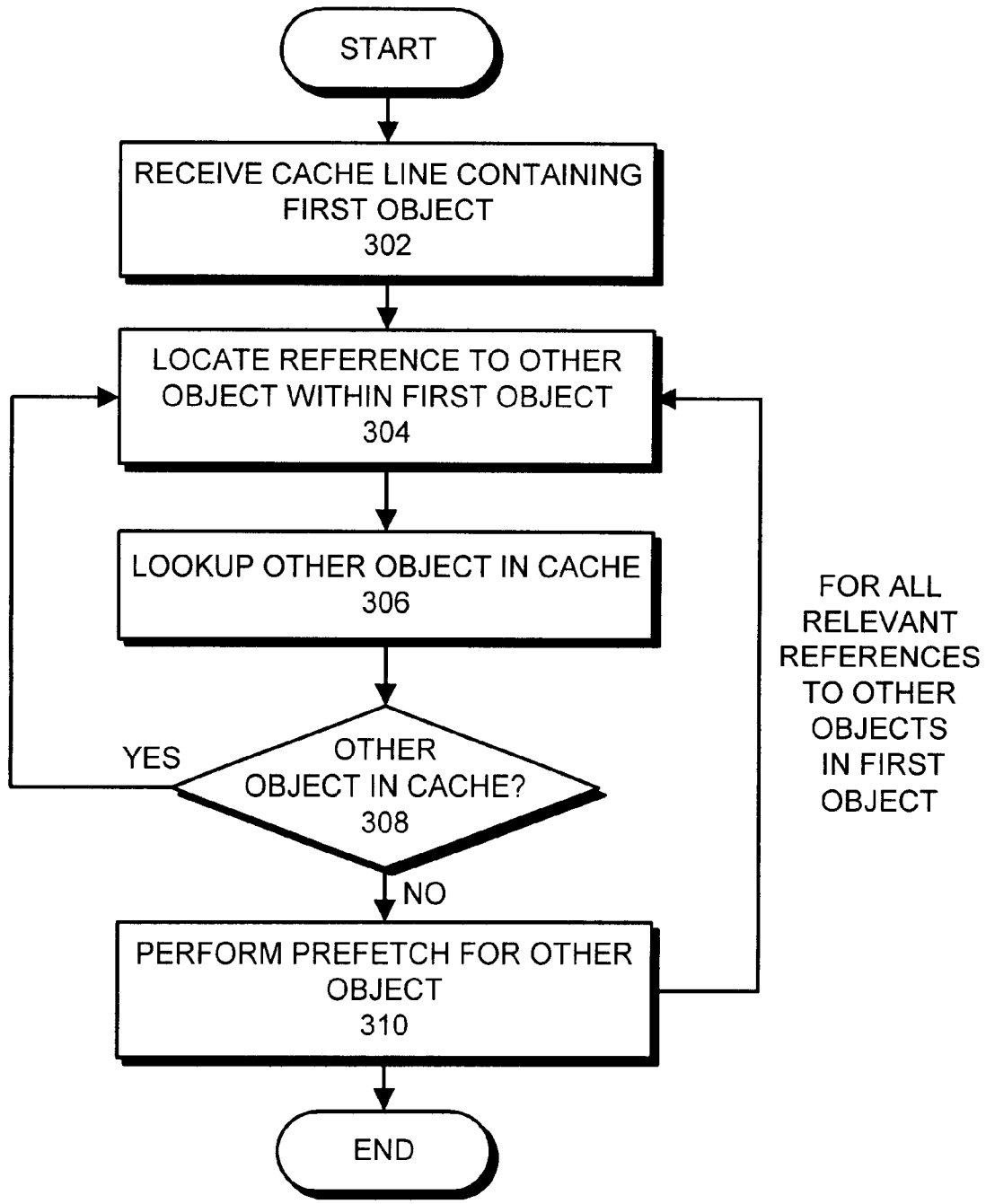
FIG. 3 is a flow chart illustrating the process of prefetching objects in accordance with an embodiment of the present invention.

FIG. 3 is a flow chart illustrating the process of prefetching objects in accordance with an embodiment of the present invention. The process starts when a first cache line containing at least a portion of a first object is received by translator 108 (step 302).

Next, prefetching circuitry within translator 108 scans through the first cache line and locates a reference to another object (step 304). Note that a reference can be identified in a number of different ways. A single bit can be maintained for each word in an object indicating whether the word contains a reference. Alternatively, the object can be structured so that references are located only at specific locations within the object.

The prefetching circuitry within translator 108 then looks up the other object in L2 cache 106 to determine if the other object has already been fetched from main memory 110 (step 306).

Note that in one embodiment of the present invention, L1 caches 104 and 105 are inclusive caches, which means that any item contained in L1 cache 104 or in L1 cache 105 is also contained within L2 cache 106. Hence, it is only necessary to perform a lookup into L2 cache 106 to determine if a cache line is located in L1 cache 104, L1 cache 105 or L2 cache 106. Also note that the present invention can work with non-inclusive caches. This merely complicates the design slightly because it involves looking for data in more places.

If a cache line for the other object is not contained within L2 cache 106, the prefetching circuitry initiates a prefetching operation to retrieve another cache line containing at least a portion of the other object from main memory 110 (step 310). The system then returns to step 304 to locate another reference in the first cache line.

If a cache line for the other object is contained within L2 cache 106, the system returns to step 304 to locate another reference in the first cache line.

After all references in the first object have been considered, the system returns to step 302 to prefetch references within another cache line. Note that this process is recursive because each successive cache line that is prefetched can be examined for other cache lines to prefetch.

In practice, it may be desirable to limit this recursive process, and there are a number of ways to achieve this. For example, the system may not prefetch something from a prefetched line. Or, the system can attach a weight to each line, with a positive value for a user-requested line. The system can then decrement this value for each level of prefetch, and can cease prefetching things from a line with a zero weight.

Also note that translator 108 can bias which references it attempts to prefetch first in order to maximize the usefulness of the data that is brought into the cache. For example, the prefetching circuitry can preferentially prefetch class references, because they are very likely to be used. Note that class references can point to "included classes" as well as "inherited classes". In one embodiment of the present invention, class references are always at a constant offset within the object so they are easy to locate.

In addition to following references from an incoming cache line to other objects, one embodiment of the present invention prefetches the rest of an object that is currently being referenced. For example, along with the current cache line comes information specifying where the current cache lines falls within the object. This allows the prefetching circuitry to prefetch other portions of the object. For example, the prefetching circuitry can preferentially fetch the header of the object because information within the header is likely to be needed.

Also note that instead of prefetching cache lines containing an object, the prefetching hardware can simply prefetch object table entries into object table cache 109 illustrated in FIG. 1. Note that it is advantageous to aggressively prefetch object table entries because they are much smaller than full objects.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using references within a first object to prefetch a second object into a cache memory, comprising:
    receiving a first cache line containing at least a portion of the first object;
    locating a reference to the second object within the first cache line,
wherein the reference to the second object is encoded using an object ID and an offset to create an object address located within an unused portion of the physical address space of a computer system, whereby object-addressed cache lines and non-object addressed cache lines can reside inside the same cache; and
    using the reference to the second object to perform a prefetching operation for the second object.

2. The method of claim 1, wherein performing the prefetching operation for the second object involves:
    examining the cache memory to determine if the second object is already present within the cache memory; and
    if not, performing the prefetching operation for the second object.

3. The method of claim 1, wherein locating the reference to the second object involves examining type information associated with data items in the first cache line to determine whether the data items contain references.

4. The method of claim 1, wherein locating the reference to the second object involves using the offsets of data items within the first object to determine whether the data items contain references.

5. The method of claim 1, wherein locating the reference to the second object involves locating a class pointer within the first object that points to a class object associated with the first object.

6. The method of claim 1, wherein performing the prefetching operation for the second object involves prefetching a second cache line containing at least a portion of the second object.

7. The method of claim 1,
wherein performing the prefetching operation for the second object involves prefetching an object table entry for the second object; and
wherein the object table entry maps an object ID to an address where the second object is located.

8. The method of claim 1, wherein if the first cache line contains a portion of the first object, the method further comprises prefetching another portion of the first object.

9. The method of claim 8, wherein prefetching another portion of the first object involves prefetching a header for the first object.

10. The method of claim 1, wherein the first object and the second object are defined within an object-oriented programming system.

11. An apparatus that uses references within a first object to prefetch a second object, comprising:
a cache memory;
a prefetching mechanism operatively coupled to the cache memory, wherein the prefetching mechanism is configured to,
receive a first cache line containing at least a portion of the first object,
locate a reference to the second object within the first cache line, wherein the reference to the second object is encoded using an object ID and an offset to create an object address located within an unused portion of the physical address space of a computer system, whereby object-addressed cache lines and non-object addressed cache lines can reside inside the same cache, and to
use the reference to the second object to perform a prefetching operation for the second object.

12. The apparatus of claim 11, wherein the prefetching mechanism is additionally configured to:
examine the cache memory to determine if the second object is already present within the cache memory, and
if not, to perform the prefetching operation for the second object.

13. The apparatus of claim 11, wherein the prefetching mechanism is configured to examine type information associated with data items in the first cache line to determine whether the data items contain references.

14. The apparatus of claim 11, wherein the prefetching mechanism is configured to use the offsets of data items within the first object to determine whether the data items contain references.

15. The apparatus of claim 11, wherein the prefetching mechanism is configured to prefetch a class object associated with the first object through a class pointer within the first object.

16. The apparatus of claim 11, wherein the prefetching mechanism is additionally configured to prefetch a second cache line containing at least a portion of the second object.

17. The apparatus of claim 11,
wherein the prefetching mechanism is configured to prefetch an object table entry for the second object; and
wherein the object table entry maps an object ID to an address where the second object is located.

18. The apparatus of claim 11, wherein if the first cache line contains a portion of the first object, the prefetching mechanism is configured to prefetch another portion of the first object.

19. The apparatus of claim 18, wherein the prefetching mechanism is configured to prefetch a header for the first object.

20. The apparatus of claim 11, wherein the first object and the second object are defined within an object-oriented programming system.

21. An computer system that uses references within a first object to prefetch a second object, comprising:
a processor;
a cache memory;
a main memory;
a prefetching mechanism coupled to the cache memory, wherein the prefetching mechanism is configured to,
receive a first cache line containing at least a portion of the first object,
locate a reference to the second object within the first cache line, wherein the reference to the second object is encoded using an object ID and an offset to create an object address located within an unused portion of the physical address space of a computer system, whereby object-addressed cache lines and non-object addressed cache lines can reside inside the same cache, and to
use the reference to the second object to perform a prefetching operation for the second object.

22. The computer system of claim 21, wherein the prefetching mechanism is additionally configured to:
examine the cache memory to determine if the second object is already present within the cache memory, and
if not, to perform the prefetching operation for the second object.

23. The computer system of claim 21, wherein the prefetching mechanism is configured to examine type information associated with data items in the first cache line to determine whether the data items contain references.

24. The computer system of claim 21, wherein the prefetching mechanism is configured to use the offsets of data items within the first object to determine whether the data items contain references.

25. The computer system of claim 21, wherein the prefetching mechanism is configured to prefetch a class object associated with the first object through a class pointer within the first object.

26. The computer system of claim 21, wherein the prefetching mechanism is additionally configured to prefetch a second cache line containing at least a portion of the second object.

27. The computer system of claim 21, wherein if the first cache line contains a portion of the first object, the prefetching mechanism is configured to prefetch another portion of the first object.

28. The computer system of claim 27, wherein the prefetching mechanism is configured to prefetch a header for the first object.

29. The computer system of claim 21, wherein the first object and the second object are defined within an object-oriented programming system.

30. The computer system of claim 21, wherein the prefetching mechanism is located within a translator interposed between the cache memory and the main memory, wherein the translator maps an object ID to a physical address within the main memory.

31. The computer system of claim 30, further comprising:
an object table coupled to the translator;
wherein the object table maps object IDs to physical addresses where the objects are located in the main memory; and
wherein the prefetching mechanism is configured to prefetch an object table entry for the second object.

32. The computer system of claim 21, wherein the cache memory is an object cache in which an object can be referenced based on an object ID.

* * * * *